(12) United States Patent
Dziuk et al.

(10) Patent No.: US 8,438,132 B1
(45) Date of Patent: May 7, 2013

(54) SYSTEM AND METHOD FOR INTEGRATING DATA ACROSS DIFFERENT ENTERPRISE SYSTEMS

(75) Inventors: Janelle Denice Dziuk, Falls City, TX (US); Jason Dennis, San Antonio, TX (US); Claudia Macias, San Antonio, TX (US); Susan E. Heinsohn, San Antonio, TX (US); Blanca Oralia McKelvey, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 468 days.

(21) Appl. No.: 11/396,095

(22) Filed: Mar. 31, 2006

(51) Int. Cl.
*G06F 7/00* (2006.01)
*G06F 17/00* (2006.01)

(52) U.S. Cl.
USPC .......................................... 707/635; 707/756

(58) Field of Classification Search .................. 707/635, 707/756
See application file for complete search history.

(56) References Cited

U.S. PATENT DOCUMENTS

| | | | | |
|---|---|---|---|---|
| 5,345,586 | A * | 9/1994 | Hamala et al. | 707/2 |
| 5,727,158 | A * | 3/1998 | Bouziane et al. | 709/225 |
| 5,806,066 | A * | 9/1998 | Golshani et al. | 707/102 |
| 5,884,310 | A * | 3/1999 | Brichta et al. | 707/4 |
| 6,785,689 | B1 * | 8/2004 | Daniel et al. | 707/754 |
| 2002/0103712 | A1 | 8/2002 | Rollins et al. | |
| 2003/0084017 | A1 * | 5/2003 | Ordille | 707/1 |
| 2003/0212654 | A1 | 11/2003 | Harper et al. | |
| 2003/0225780 | A1 * | 12/2003 | Adams et al. | 707/102 |
| 2004/0034651 | A1 | 2/2004 | Gupta et al. | |
| 2005/0222931 | A1 | 10/2005 | Mamou et al. | |
| 2007/0203944 | A1 * | 8/2007 | Batra et al. | 707/104.1 |

OTHER PUBLICATIONS

Benedikt, Michael et al., "Capturing both Types and Constraints in Data Integration," *SIGMOD*, 2002, 12 pages.
Ulrich, William M., "Legacy Transformation: Leveraging Information Assets to Deliver Business Value," Tactical Strategy Group. Inc., www.systemtransofrmation.com, 2002, 24 pages.
Ziegler, Patrick et al., "Three Decades of Data Integration—All Problems Solved?" Database Technology Research Group, Department of Informatics, University of Zurich, Winterthurerstrasse 190, CH-8057 Zürich, Switzerland, 2004, 10 pages.
Ziegler, Patrick et al., "User-Specific Semantic Integration of Heterogeneous Data: The SIRUP Approach," Database Technology Research Group, Department of Informatics, Univetrsity of Zurich, Winterhurestrasse 190, CH-8067 Zürich, Switzerland, 2004, 21 pages.

* cited by examiner

*Primary Examiner* — Cam-Linh Nguyen
*Assistant Examiner* — Chelcie Daye
(74) *Attorney, Agent, or Firm* — Brooks, Cameron & Huebsch, PLLC

(57) ABSTRACT

A method and system for integrating data across different systems is disclosed. Data in a plurality of databases are integrated by identifying the common data elements with equivalent semantics and selecting a preferred syntax for the data. A new record including the common data elements and data with preferred syntax is made available to users.

12 Claims, 3 Drawing Sheets

SYSTEM AND METHOD FOR INTEGRATING DATA ACROSS DIFFERENT ENTERPRISE SYSTEMS

CROSS REFERENCE TO RELATED APPLICATIONS

This application is related by subject matter to the following commonly assigned applications, the entirety of which are hereby incorporated by reference herein: U.S. patent application Ser. No. 11/396,096 filed on same date herewith and entitled "SYSTEM AND METHOD FOR SHARING DATA ACROSS DIFFERENTS ENTERPRISE SYSTEMS"; and U.S. patent application Ser. No. 11/395,058 filed on same date herewith and entitled "SYSTEM AND METHOD FOR INTERGRATING DATA ACROSS DIFFERENT ENTERPRISE SYSTEMS."

TECHNOLOGY FIELD

The present system and method relate generally to the use of heterogeneous semantic data in a plurality of systems, and, more particularly, to systems and methods for providing homogenous semantic data with homogeneous syntax about a subject to customers and service providers in an enterprise.

BACKGROUND

In a typical business enterprise there is an enormous amount of data that has to be managed to deliver to the consumer the goods and services produced by the enterprise. For example, a retailer may have data about products, customers, costs, suppliers and the like. A university may have data about students, enrollment, course offerings, grades, etc. A financial services company may have information about customers, accounts, loans, insurance, insured assets, etc. Business enterprises need to manage all of the data in the organization irrespective of where it resides. Problems arise when the data resides in disparate databases, on multiple platforms, or different operating systems. Compounding the problem is the way information systems in business enterprises evolve over time. Naming conventions, product coding, and the actual representation of the data in the data elements may be different on different systems. Numerous systems and methods have been developed to provide the enterprise with the ability to integrate data across systems. See e.g. "Three Decades of Data Integration—All Problems Solved?" Patrick Ziegler and Klaus R. Dittrich, Database Technology Research Group, Department of Informatics, University of Zurich, Winterthurerstrasse 190, CH-8057 Zurich, Switzerland (2004). It is recognized that the integration of data that is described by different data models or heterogeneous semantics or syntax make the challenge of data integration more difficult.

For example, in a financial services enterprise that provides consumers with various distinct services there may be data collected in various systems using related schemas but different semantics and/or syntax. One system may support the auto insurance business of the enterprise and the other may support the auto loan business of the enterprise. An example of the different syntax for the same vehicle would be: one system describing the vehicle as <CHEV SUBURBA 1500 UTIL 4x2>; and the other system describing the vehicle as <CHEVY SUBRUBAN>. The data is directed to the same vehicle (i.e. the same semantics) but use different syntax. Further complicating matters is that the data may be directed to different vehicles thereby creating possible confusion if the data were interchanged. An example of data with different semantics may be data in a field <COUNTY> which in one system may be the county where the vehicle is garaged (for insurance purposes), while in the other system it may be the county where the vehicle is titled.

Users within a business enterprise typically use a database management system (DBMS) to access the data, and the data is collected and structured in a database. Examples of commercially available DBMS include dBase, Paradox, IMS, and Oracle. A DBMS allows users to create, update, and extract information from their databases.

In a typical database, data is structured in a hierarchical arrangement. A unit of data stored in a field is a data item. A field is the physical storage unit of the data item, and a data element is a logical definition of data. Examples of data elements would include NAME, ADDRESS, etc. The data element NAME exists only once, and is stored in the <NAME> field in each record. A record is a group of related fields that store data about a subject. For example, a record may include the fields <NAME>, <ADDRESS>, <VEHICLE MAKE>, <VEHICLE YEAR>, <VEHICLE MODEL>, . . . etc. Each record comprises a number of fields and no two fields in a record can have the same field name.

Some DBMS store related records in a table. An example of a table may be a customer table having the names and addresses of the customers of an enterprise. A table may be visualized as follows:

| CUSTOMERS | | | | | |
|---|---|---|---|---|---|
| CUST_NO | GIVEN_NAME | SURNAME | STREET_ADDR | CITY | STATE |
| 00001 | John | Doe | 1234 Main Street | Houston | TX |
| 00120 | Jane | Smith | 5555 Broadway | Austin | TX |
| 00034 | Pablo | Perez | 1010 SW 8th ST | Miami | FL |

The table is made up of a number of records, each record having a number of fields, each field having a unique field name.

Electronic commerce (e-commerce) has resulted in an increased need for data integration across enterprise systems. E-commerce comprises the distribution, purchase, sale, marketing, and servicing of products or services over a network such as the Internet. E-commerce provides some advantages to the "brick and mortar" style of commerce. For example, an e-commerce site implemented as a web site may lower transaction costs by automating the order and order fulfillment processes. To be successful, web sites must provide an easy, reliable and secure way for customers to exchange information and order the goods and services. Providing a seamless view of the customer relationship, so that the customer and customer service representatives have the same view, of the customer is also considered important to having a user friendly electronic commerce site. An e-commerce web site may be integrated into the enterprise systems to offer customers more information such as order status, and delivery tracking. The challenge for e-commerce web site operators is to provide data to the customer or user that may be derived from multiple enterprise systems.

One need for this kind of data integration is to make a web page more "user friendly" to customers. For example, in a business enterprise that offers various financial services to customers, the service offerings at a web site may include the financing of a loan to purchase the car and the sale of a contract of insurance for the car. For each of those transactions there is a common set of data elements that may be used by systems in the sales operation, the financing operation and the insurance operation. For example, the CUSTOMER NAME, ADDRESS, the VEHICLE, VEHICLE PURCHASE PRICE, VEHICLE LOCATION. Ideally, the customer should not be required to enter that information more than once, rather the server receiving the data from the customer should be able to make use of the common data and integrate the data in the different systems. In the same business enterprise, if the customer has obtained an auto loan from the financing operation of the enterprise and makes an inquiry about insurance for that vehicle, the information relating to the vehicle should be available to the customer service representative so that the customer does not have to provide the same information multiple times.

Existing systems have not provided the degree of integration required for effective e-commerce web sites in cases where the enterprise offering services through the site operates though multiple business units or with multiple data systems. Consequently, there is a need to improve the customer self service features of e-commerce web sites by providing the customer access to data contained in multiple systems of an enterprise. Similarly, there is a need to enhance the productivity of customer service representatives by providing the customer service representatives with access to data about a customer that may be maintained in different systems and/or in different business units.

SUMMARY

Accordingly, a method and system disclosed herein provides a homogeneous data source to a user from at least two heterogeneous data sources having a set of common data elements and heterogeneous data item syntax in the common data elements. The result is accomplished by identifying the set of common data elements, comparing data items in the common data elements, determining which data items refer to the same object and creating a database including the common data elements. A preferred data item syntax is selected and the common data elements are populated with data items having the preferred data item syntax. The users are then provided access to the database.

Another method and system disclosed provides data related to a customer to a user in an enterprise having a first data source and at least a second data source having data elements associated with fields containing data items related to the customer. This is accomplished by determining which data elements in the first and at other data source have equivalent semantics and defining a set of common data elements with equivalent semantics. The customer is identified and the fields associated with the common data elements in the data sources are searched. The data retrieved is then integrated into a record that can be displayed to the user.

Yet another method and system disclosed provides the ability to pre-fill embedded fields in a web document with data from a plurality of data sources, said data being associated with a customer. That is accomplished by identifying the customer, identifying a set of data elements in the data sources associated with the customer that have equivalent semantics and integrating the data in the fields in the set of data elements that have equivalent semantics into a record. The web document is then populated with data from the record.

BRIEF DESCRIPTION OF THE DRAWINGS

A more complete appreciation of the various embodiments and many of the attendant advantages thereof will be readily obtained as the same becomes better understood by reference to the following detailed description when considered in connection with the accompanying drawing; it being understood that the drawings contained herein are not necessarily drawn to scale; wherein.

DETAILED DESCRIPTION OF ILLUSTRATIVE EMBODIMENTS

Figure 1:
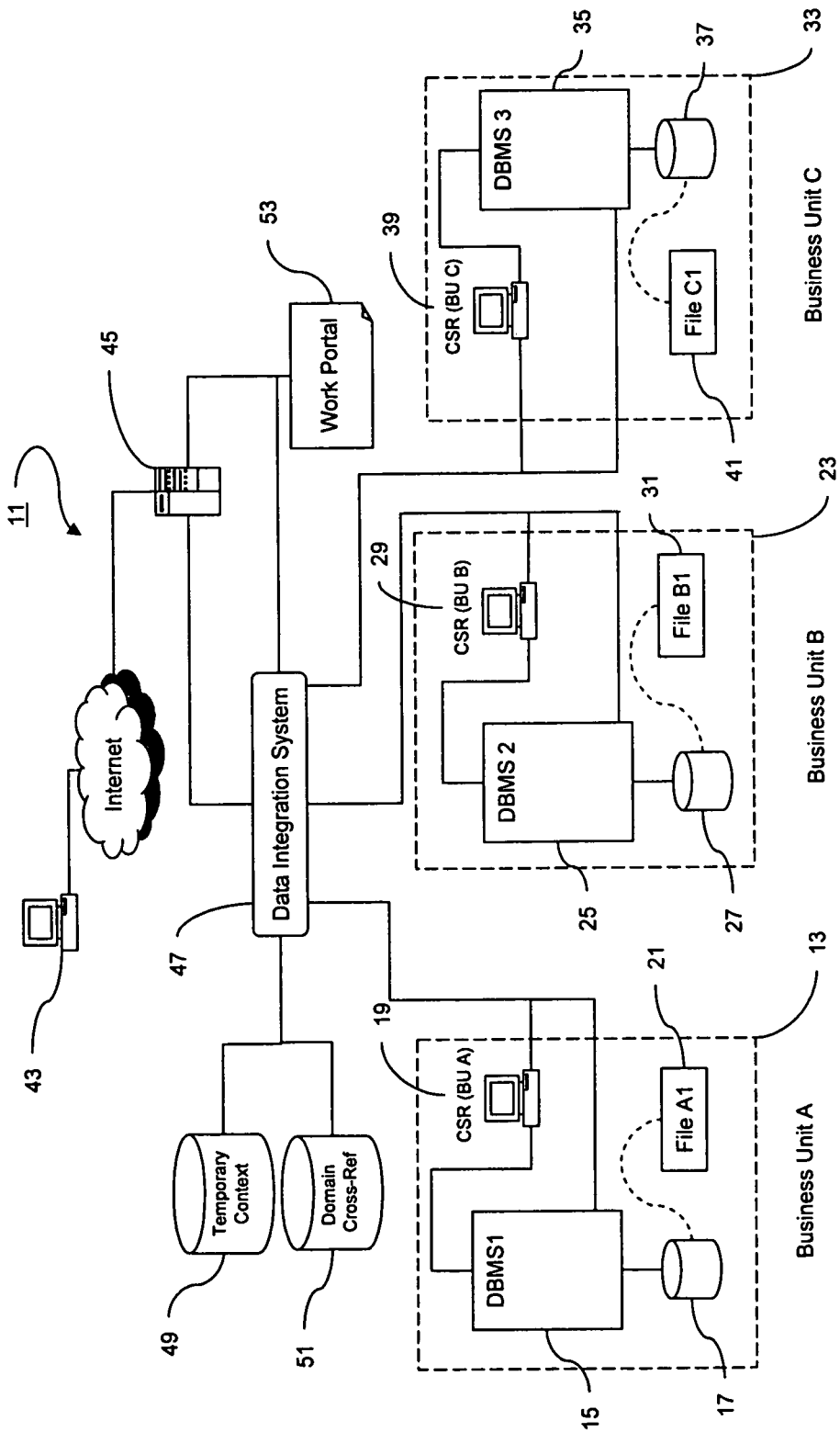
FIG. 1 is a schematic of an enterprise environment with a system for integrating data across different enterprise systems.

FIG. 1 illustrates a typical enterprise environment 11 having multiple systems. The example enterprise in FIG. 1 includes three business units, Business Unit A, Business Unit B, and Business Unit C. Typically, a Business Unit is an independent grouping of organizations, products or technologies within a parent organization, with complete resource and profit responsibility for serving an identified market(s). Examples of Business Units within an enterprise may include an Insurance Business Unit and a Financial Services Business Unit within a single enterprise. Although three business units are illustrated and discussed in this example, it should be readily apparent that the concepts described in this disclosure may also apply to one business unit with multiple system or more than one business units with one or more systems each. Similarly, the function of the Business Unit is for illustration purposes only, and the business unit may undertake any type of activity requiring data and systems to service the data needs of the business unit. Additionally, although in this example the business units are within an enterprise, the systems and methods described below may be applied to business units in more than one enterprise. For example two or more enterprises may have an alliance or partner type agreements to cross-sell each others products—thus the need to share data.

Illustrated in FIG. 1 is a Business Unit A System 13, that may include one or more data base management systems 15, one or more database storage units 17, and one or more customer service representative interface 19. Associated with the data base management system 15 and stored in database storage unit 17 is one or more data files or tables (File A) 21. The structure of the data file includes a plurality of records each having a plurality of fields each with an associated field name. For example, if File A 21 were a customer file, the records may include fields for a customer name, address, county, vehicle make, vehicle year, manufacturer's suggested retail price, list price, and other relevant information allowing the business unit to execute or keep records of a transaction with a specific customer. The organization of the fields and records in the file or table (e.g. the layout of the table) is referred to as the schema of the data base. The data in each field of File A 21 has a consistent syntax (a systematic orderly arrangement of the information). For example in a specific data file, a DATE field may have the syntax "dd/mm/yyyy". All the data elements in the date field in that file must follow that syntax or there may be an error in the reading of the data. However, in a different data file the syntax may be "mm/dd/yyyy." Thus for two different files having records including fields with the same field name DATE (i.e. common fields), the data elements may be expressed differently thereby posing a barrier in the exchange of data between the two systems. Consequently, to be able to share data elements across two systems the syntax of the data elements in related fields should be harmonized.

Figure 2:
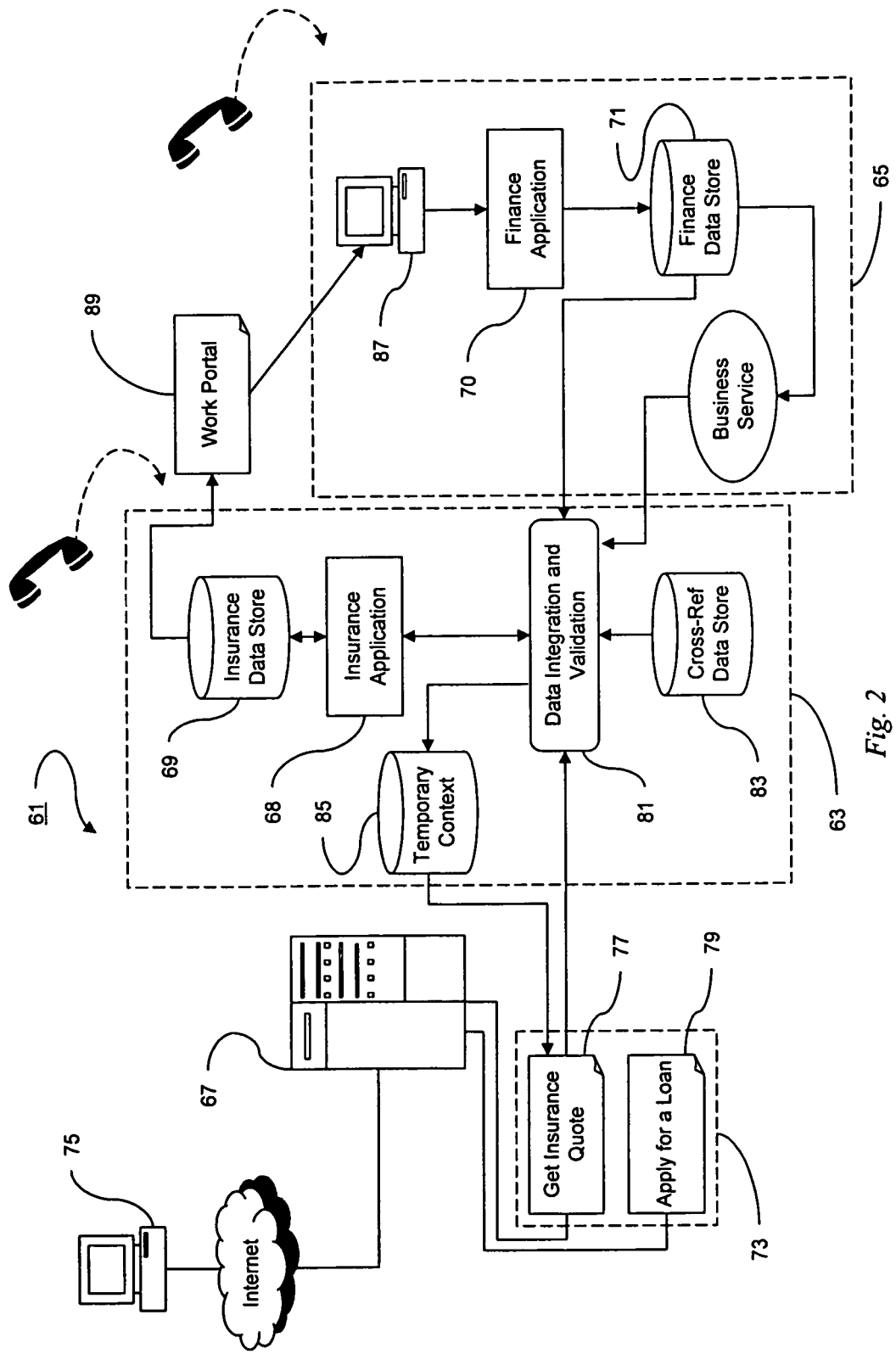
FIG. 2 is a schematic of a financial services company with a system for integrating data across an insurance business unit and a bank and financing business unit.

Also illustrated in FIG. 2 is a second Business Unit B 23 that includes one or more database management systems 25, one or more database storage units 27, and one or more customer service representative interface 29. Associated with the data base management system 25 and stored in database storage unit 27, is one or more data files or tables File B 31. Similarly, a third Business Unit C 33 that includes one or more database management systems 35, one or more database storage units 37, and one or more customer service representative interface 39. Associated with the data base management system 35 and stored in database storage unit 37, is one or more data files or tables File C 41.

In a typical enterprise, File A 21, File B 31, and File C 41 may each have data relevant to a specific object. For example, if the enterprise was a university, Business Unit A 13 may be the registrar's office and may include student enrollment information. Business Unit B 23 may be a financial aid office and may include information about the student's current loans, and Business Unit C 33 may be the student health office and may include information about the student's health coverage. Alternately, Business Unit A 13 may provide insurance and Business Unit B 23 may provide lending services. The data in File A 21, File B 31 and File C 41 would be organized as records having a plurality of fields. One of the fields in each file may be a customer identification number. Typically there will be a set of fields that are common to the records in File A 21, File B 31 and File C 41. For example, a customer's name, address, telephone number, e-mail address may all be included as data elements in the set of common fields. The schema of the database may be different for each file and the syntax of the data in the common fields may be different and the syntax may be different (e.g. dates may be expressed with different syntax). The handling of the different syntax is explained below.

In the systems illustrated in FIG. 1, a customer computer 43 is provided with access to some of the data contained in the multiple systems in Business Units A-C. The customer through customer computer 43 may access a server 45 that creates a web document including the relevant data. The server may include a web server software that interacts with a data integration system 47. Data integration system 47 accesses the data base storage units 17, 27, and 37 to retrieve the relevant data responsive to a request for a web page from the customer computer 43. Integrated data associated with the customer 43 from File A 21, File B 31 and File C 41 is stored in a temporary context database storage unit 49. The Integrated data may be created by accessing a domain cross reference database in database storage unit 49. Access to the integrated data may be provided to Customer service representatives though user interfaces 19, 29, and 39 by access to a web base work portal 53 through the data integration system 47.

Another way of configuring the integrated data is as a binary large object (BLOB). A BLOB is a collection of data stored in binary format as a single entity in a database management system. The system may use a BLOB to store customer data within context and pass it off to another online application or customer service area. This is a temporary data storage method that provides companies with a quick win to data sharing. The data may be accessed through the use of a Structured Query Language (SQL) instruction that lets the user select, insert, update, and locate the data. An SQL BLOB is a built-in type that stores a BLOB as a column value in a row of a database table. By default drivers implement Blob using an SQL locator (BLOB), which means that a Blob object contains a logical pointer to the SQL BLOB data rather than the data itself. A BLOB object is valid for the duration of the transaction in which it was created. For example, java.sql provides an application program interface for accessing and processing data stored in a data source (usually a relational database) using the Java programming language. Methods in the java.sql interfaces ResultSet, CallableStatement, and PreparedStatement, such as getBlob and setBlob allow a programmer to access an SQL BLOB value. The BLOB interface provides methods for getting the length of an SQL BLOB value, for materializing a BLOB value on the client, and for determining the position of a pattern of bytes within a BLOB value. In addition, this interface has methods for updating a BLOB value. Thus, a BLOB may be substituted as the temporary context database storage unit 49.

A number of options are available for a data integration system. For example, a data integration system may include a web service (i.e. a software system designed to support interoperable machine-to-machine interaction over a network). Web services have interfaces described in a format such as Web Services Description Language (WSDL). Other systems interact with the Web Service in a manner prescribed by its interface using messages, which may be enclosed in a Simple Object Access Protocol (SOAP) envelope. Messages may be conveyed using HTTP, and would include XML and other Web-related standards. Web services may be used by software applications written indifferent programming languages and running on different platforms to exchange data. Other ways of providing data integration include mediated query systems. In such a system, an application is provided that includes a global query processor. Sub-queries are sent to the various data sources and returned to the application and combined. Yet another way of providing data integration is through the use of a federated database system. In that system the data from the various data sources is integrated logically and accessed through a new database management system.

A query for the data of contained in the various database storage units 17, 27 and 37 may be initiated by a customer through a customer computer 43 by accessing a web page on the server 45. Web server 45 would access the data integration system 47 that conducts a query of the relevant fields in File A 21, File B 31 and File C 41. The integrated data is made available to the server by the data integration system 47. The integrated data is used to populate a web document that may be transmitted to the customer computer 43.

The preceding arrangement may be used as a way of pre-filling a form included in a web document to facilitate the interaction with the user. Thus, any data held File A 21, File B 31 and File C 41 would be used to populate the form in the web document. A typical application may be in an electronic commerce system. A customer has already purchased products from Business Unit C and data relating to that customer is held in File C 41. At another point in time, the customer decides to purchase a product from Business Unit A. Rather than entering data already held in File C, the data integration system 47 would search File A 21, File B 31 and File C41. Upon finding the data relating to the customer in File C 41, data integration system 47 would extract the data held in fields in File C 41 that are common with fields in the schema of File A 21. The data would be inserted into a web document that is returned to the customer computer 43. Thus when the customer is identified, the customer is not prompted to fill in values for data already held in one of the files of the enterprise.

The system may also be used by customer service representatives to provide quicker service to customers that may call in for service. Again, using the preceding example, a customer who has purchased a product from Business Unit C calls a Customer service representative for Business Unit A and wants to process an order by telephone. Upon receiving sufficient information to identify the customer, the customer service representative accesses the work portal 53 and is presented with all of the relevant data about the customer that is held in File C 41. Thus, the customer does not have to answer redundant questions and the customer service representative can process the order more efficiently.

Illustrated in FIG. 2 is another application of a system and method for integrating data across different enterprise systems. In FIG. 2 a system 61 includes an automobile insurance subsystem 63 and a bank and financing subsystem 65, and a server 67.

The automobile insurance subsystem 61 includes an insurance application 68 and an insurance data store 69 that includes files relating to customers that have purchased insurance from the insurance business unit of the enterprise. For example, the data collected for the insurance business unit may include: the name of the insured, the address of the insured, the telephone number of the insured, the year, make and model of the insured vehicle, the purchase price of the vehicle, and the vehicle identification number (VIN). Other data relevant to the insurance business unit would be included in the customer records in insurance data store 69, such as limits of coverage, etc.

The bank and financing subsystem 65 includes a finance application 70 and a finance data store 71 holding files relating to customers that have financed an automobile through the bank and finance business unit. The data collected by the bank and finance business unit may include: the name of the borrower, the address of the borrower, the telephone number of the borrower, the year, make and model of the financed vehicle, the purchase price of the vehicle, and the vehicle identification number (VIN). Other data relevant to the bank and finance business unit would be included in the customer records in Finance data store 71, such as payment records, etc.

The System 61 may also include an internet user interface 73 which creates web documents to be accessed by a customer computer 75. The web documents are used to implement electronic commerce processes such as requesting an insurance quote 77 or applying for an automobile loan 79. Also included in the system 61 is a data integration and validation system 81 coupled to the get insurance quote process 77 and the apply for a loan process 79 that integrates the data included in insurance data store 69 and finance data store 71.

The system 61 may also include a cross reference data store 83 that includes a file cross referencing the syntax of the data in the finance data store 71 to the syntax of the insurance data store 69. The system 61 may also include a temporary context data store 85 that can be used to provide integrated data to the apply for loan process 79 and the get insurance quote process 77.

Also included in the example illustrated in FIG. 2 is a customer service representative interface 87 that can access the integrated data through a web based work portal 89.

The advantages of the system 61 are illustrated by the following examples:

Example 1

A customer plans to finance and insure a new car though the business enterprise. The customer accesses the apply for a loan process 79 through the interne and is prompted though a number of questions (e.g. name, address, vehicle make & year, value of the vehicle, etc.). After the loan information is processed the customer is prompted to obtain insurance coverage. When the customer accesses the get insurance quote process 77, rather than asking the same questions again, the system 61 provides the customer with a pre-filled form that the customer may edit if desired. This saves the customer having to enter the same data twice.

Example 2

A customer completed the process for obtaining an auto loan and calls the insurance business unit to add the new car to the customer's policy. The customer service representative can access finance business unit information through the business portal 89 thereby saving the customer from having to provide the same information through the telephone.

Example 3

A customer calls the insurance business unit to adjust the insurance coverage. The insurance business unit customer representative notices that the automobile is currently financed by a competitor. The insurance business unit customer representative asks the customer whether the customer would like to move the loan to the finance business unit of the enterprise. The customer agrees, and the insurance business unit representative transfers the call to the finance business unit customer representative. The finance business unit customer representative can now access all current data about the customer through the work portal 89.

Figure 3:
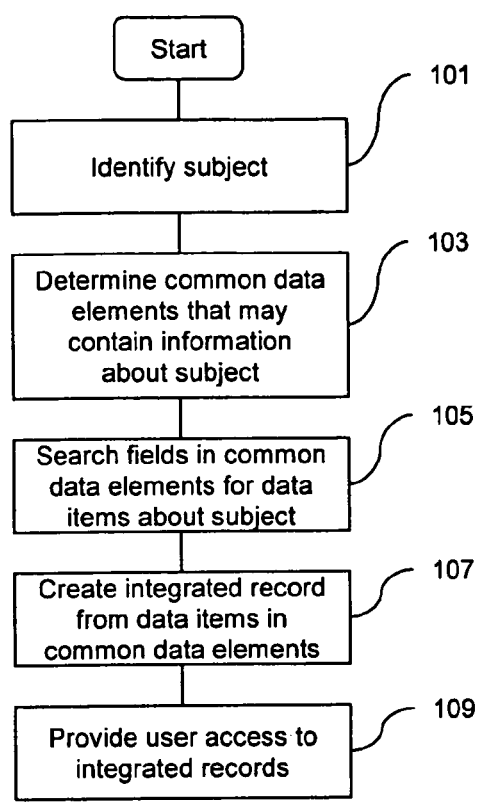
FIG. 3 is a process flow diagram for a method of integrating data from different enterprise systems.

Illustrated in FIG. 3 is a high-level process flow diagram for a method of integrating data from different enterprise systems. In an enterprise that has a plurality of systems each being capable of holding data about an identifiable subject, but each including data sources that may have different schemas, semantics and/or syntax the method of integrating the data requires the identification of the subject (method element 101). The data in all data sources is examined to determine the common data elements that may contain information about the subject (method element 103). The fields in the common data elements are searched to determine if the fields contain data related to the subject (method element 105). A new database is created integrating and harmonizing the data from the common data elements (method element 107). Integration may be accomplished by creating a cross reference table associating the syntax of a data item with a preferred syntax, and converting the syntax of all data items in the common data elements to the preferred syntax. Users are provided with access to the integrated database through a data base management system, a web service application or a web portal.

An example of the method illustrated in FIG. 3 may involve a database for an automobile insurance business unit and a database for an automobile financing business unit. In that case, the subject is a customer. Identification of the common data elements would yield data elements such as CUSTOMER ID, CUSTOMER NAME, CUSTOMER ADDRESS, CUSTOMER TELEPHONE, CUSTOMER E-MAIL, AUTO MAKE, MODEL AND YEAR, VEHICLE IDENTIFICATION NUMBER, PURCHASE PRICE. That means that for a particular customer, the each data base may have data in fields associated with those data elements. For a particular customer, a new record would be created having fields associated with the common data elements, and having data with a preferred syntax.

Figure 4:
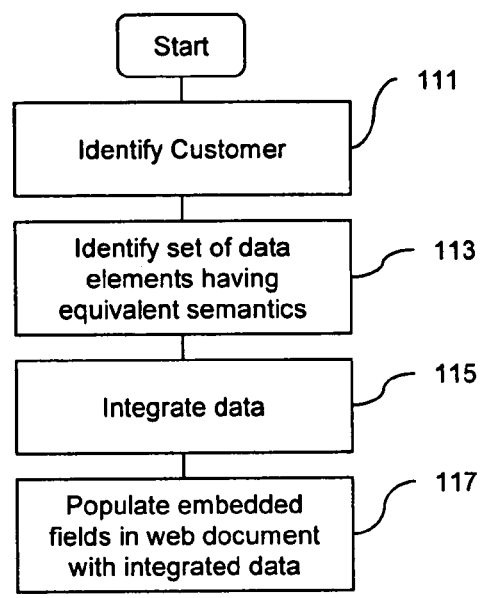
FIG. 4 is a process flow diagram for a method of pre-filling embedded fields in a web document with data, associated with a customer, from a plurality of data sources

FIG. 4 illustrates a high level process diagram for populating a web document with data related to a customer available from a plurality of data sources. The customer is identified, usually by correlating data from a LOGON ID, PASSWORD with data in a <CUSTOMER ID> field in the various data sources (method element 111). Data elements having equivalent semantics are identified (method element 113), and the data is integrated (method element 115). Integration is accomplished by determining which data items in the fields associated with said data elements have different syntax, selecting a preferred syntax for each data item, and creating a record including the common data elements populated with the data items of the preferred syntax. The web document is populated with the integrated data (method element 117). This may be accomplished by inserting an instruction on the web document to retrieve data items from the integrated record.

An example of the application of the method illustrated in FIG. 3 is in conjunction with a web site that allows a customer to obtain insurance for an automobile and finance the purchase of the automobile. The customer would log on the site with a log-on id and password. A server application accessible to the enterprise providing the services would create a web document having embedded fields associated with questions or instructions to the customer. For example, "please insert your address," "please identify the vehicle being covered," or similar prompts for relevant information. The method illustrated in FIG. 4 would result in the finance data base and insurance database being searched and integrated so that all of the relevant information that is already available is inserted into the web document.

Although the system and method have been described with reference to specific embodiments, this description is not meant to be construed in a limited sense. Various modifications of the disclosed embodiments, as well as alternative embodiments of the system and method, will become apparent to persons skilled in the art upon reference to the description of the embodiments disclosed herein. It is, therefore, contemplated that the appended claims will cover such modifications that fall within the scope of the various embodiments.

What is claimed:

1. A method for providing a homogeneous data source to a user from at least two heterogeneous data sources having a set of common data items and heterogeneous data element orderly arrangements in said common data items comprising:
    identifying a subject, by a computing device having a computer processor and computer-readable code stored on a computer-readable medium and executable by the computer processor;
    identifying, by the computing device, the set of common data items;
    comparing, by the computing device, data items in the common data items;
    determining, by the computing device, which data items refer to the subject;
    storing, by the computing device, the data items that refer to the subject in a database;
    determining, by the computing device, which data items in the database have different orderly arrangements of a plurality of data elements;
    selecting, by the computing device, a preferred data element orderly arrangement for each of the plurality of data elements, the preferred data element orderly arrangement having a same number of data elements as each of the different orderly arrangements of the plurality of data elements;
    populating, by the computing device, the common data items in the database with data elements having the preferred orderly arrangement for each of the plurality of data elements, accomplished by creating a cross reference database associating the orderly arrangements of the data elements that correspond to the common data items stored in the database with the preferred data element orderly arrangement, by converting the orderly arrangements of all the plurality of data elements corresponding to the common data items stored in the database to the preferred orderly arrangement, and loading the common data items with the preferred orderly arrangement of the plurality of data elements in the appropriate common data item in the database;
    replacing, by the computing device, the data items in the common data items of the two heterogeneous data sources with the associated data items having the preferred orderly arrangement of the plurality of data elements in response to populating the common data items in the database; and
    providing the user access to the database.

2. The method of claim 1 wherein said method element of providing the user with access to the database comprises:
    providing the user with a database management system to access the database.

3. The method of claim 1 wherein said method element of providing the user with access to the database comprises
    providing the user with a web services application to access the database.

4. The method of claim 1 wherein said method element of providing the user with access to the database comprises:
    providing a portal to access the data items in said database.

5. A system for providing a homogeneous data source to a user from at least two heterogeneous data sources having a set of common data items and heterogeneous data element orderly arrangements in said common data items, comprising a processor and at least one subsystem that:
    identifies a subject;
    identifies the set of common data items;
    compares data items in the common data items;
    determines which data items refer to the subject;
    stores the data items that refer to the subject in a database;
    determines which data items in the database have different orderly arrangements of a plurality of data elements;
    selects a preferred data element orderly arrangement for each of the plurality of data elements, the preferred data element orderly arrangement having a same number of data elements as each of the different orderly arrangements of the plurality of data elements;
    populates the common data items in the database with data elements having the preferred orderly arrangement for each of the plurality of data elements, accomplished by creating a cross reference database associating the orderly arrangements of the data elements that correspond to the common data items stored in the database with the preferred data element orderly arrangement, by converting the orderly arrangements of all the plurality of data elements corresponding to the common data items stored in the database to the preferred element orderly arrangement, and loading the common data items with the preferred orderly arrangement of the plurality of data elements in the appropriate common data item in the database;

at least one subsystem that replaces the data items in the common data items of the two heterogeneous data sources with the associated data items having the preferred orderly arrangement of the plurality of data elements in response to populating the common data items in the database; and provides the user access to the database.

6. The system of claim 5 wherein said subsystem that provides the user with access to the database comprises at least one subsystem that:

provides the user with a database management system to access the database.

7. The system of claim 5 wherein said subsystem that provides the user with access to the database comprises at least one subsystem that:

provides the user with a web services application to access the database.

8. The system of claim 5 wherein said subsystem that provides the user with access to the database comprises at least one subsystem that:

provides a portal to access the data items in said database.

9. Non-transitory computer readable medium for providing a homogeneous data source to a user from at least two heterogeneous data sources having a set of common data items and heterogeneous data element orderly arrangements in said common data items comprising instructions to:

identify a subject;
identify the set of common data items;
compare data items in the common data items;
determine which data items refer to the subject;
store the data items that refer to the subject in a database;
determine which data items in the database have different orderly arrangements of a plurality of data elements;

select a preferred data element orderly arrangement for each of the plurality of data elements, the preferred data element orderly arrangement having a same number of data elements as each of the different orderly arrangements of the plurality of data elements;

populate the common data items in the database with data elements having the preferred orderly arrangement for each of the plurality of data elements, accomplished by creating a cross reference database associating the orderly arrangements of the data elements that correspond to the common data items stored in the database with the preferred data element orderly arrangement, by converting the orderly arrangements of all the plurality of data elements corresponding to the common data items stored in the database to the preferred element orderly arrangement, and loading the common data items with the preferred orderly arrangement of the plurality of data elements in the appropriate common data item in the database;

instructions to replace the data items in the common data items of the two heterogeneous data sources with the associated data items having the preferred orderly arrangement of the plurality of data elements in response to populating the common data items in the database; and provide the user access to the database.

10. The computer readable medium of claim 9 wherein said instructions to provide the user with access to the database comprises instructions to:

provide the user with a database management system to access the database.

11. The computer readable medium of claim 9 wherein said instructions to provide the user with access to the database comprises instructions to:

provide the user with a web services application to access the database.

12. The computer readable medium of claim 9 wherein said instructions to provide the user with access to the database comprises instructions to:

provide a portal to access the data items in said database.

* * * * *